United States Patent
Ronnekleiv et al.

(10) Patent No.: US 6,888,125 B2
(45) Date of Patent: May 3, 2005

(54) FIBER OPTIC SENSING SYSTEMS AND METHOD OF USE THEREOF

(75) Inventors: Erlend Ronnekleiv, Trondheim (NO); Dag Roar Hjelme, Trondheim (NO); Jon Thomas Kringlebotn, Trondheim (NO)

(73) Assignee: Optoplan AS, Trondheim (NO)

( * ) Notice: Subject to any disclaimer, the term of this patent is extended or adjusted under 35 U.S.C. 154(b) by 181 days.

(21) Appl. No.: 10/017,707

(22) Filed: Dec. 12, 2001

(65) Prior Publication Data

US 2003/0142319 A1 Jul. 31, 2003

(30) Foreign Application Priority Data

Dec. 12, 2000 (GB) .............................................. 0030289

(51) Int. Cl.$^7$ .............................. G01J 4/00; G01N 21/25
(52) U.S. Cl. .............................. 250/227.19; 250/227.23
(58) Field of Search ........................ 250/227.19, 227.23; 356/477, 478; 385/12, 37

(56) References Cited

U.S. PATENT DOCUMENTS

| | | | | |
|---|---|---|---|---|
| 4,818,064 A | * | 4/1989 | Youngquist et al. | .......... 385/12 |
| 5,361,130 A | * | 11/1994 | Kersey et al. | .............. 356/478 |
| 5,564,832 A | | 10/1996 | Ball et al. | ................... 374/161 |
| 5,844,927 A | | 12/1998 | Kringlebotn | .................... 372/6 |
| 6,097,487 A | | 8/2000 | Kringlebotn et al. | ........ 356/345 |
| 6,137,573 A | | 10/2000 | Luke et al. | ................. 356/351 |

OTHER PUBLICATIONS

Copy of International Search Report for Serial No. PCT/GB01/05490 dated Feb. 25, 2002. X reference and Article by Zhang, et al. were previously cited in an IDS.

W. Zhang, et al.; "A fibre grating DFB laser for generation of optical microwave signal"; Optics & Laser Technology 32 (2000) pp. 369–371.

* cited by examiner

*Primary Examiner*—Stephone B. Allen
(74) *Attorney, Agent, or Firm*—McCormick, Paulding & Huber LLP

(57) ABSTRACT

A fiber optic sensor system comprises at least one measuring sensor 1 providing an optical output dependent upon one or more parameters to be measured, e.g. temperature, and at least one reference sensor 2 providing a reference output for comparison with the measuring sensor output. The reference sensor is provided in a birefringent fiber.

The system includes a detecting means 13,14 whereby a reference beat signal $f_2$ is derived by measuring the optical frequency splitting between frequency components in different polarization planes of the reference sensor output. A further beat signal $f_3$ is generated between the measuring and reference sensor outputs, such beat signals being used to derive a measurement of one or more parameters.

12 Claims, 7 Drawing Sheets

FIBER OPTIC SENSING SYSTEMS AND METHOD OF USE THEREOF

This application is entitled to the benefit of and incorporates by reference essential subject matter disclosed in UK Patent Application No. 0030289.3 filed on Dec. 12, 2000.

FIELD OF THE INVENTION

This invention relates to fiber optic sensor systems, and relates in particular to improvements in such systems enabling more accurate and higher resolution measurements of optical signals derived from fiber optic sensors.

BACKGROUND

There are a variety of fiber optic sensors, such as Bragg grating sensors, fiber laser sensors, and interferometric sensors having the potential for measuring small changes in temperature, pressure or strain on or established in an optical fiber. Strains can be induced by physical, chemical or biological parameters, or by electromagnetic fields, and these sensors can be configured to measure accurately a variety of different parameters (measurands). Hence, it is known that optical fibers may be provided with claddings or coatings which react to particular measurands to establish strain within a fiber, this strain changing a detectable optical property of the fiber such that a particular parameter can be measured.

Such sensors are used in medical applications, and in various other applications including engineering and oil and gas exploration.

In relation to such sensors, the varying optical properties of the fiber at one or more sensing locations thereof can be provided by various known means. For example, sensing regions of the fiber may be configured to provide a form of "Fabry-Perot" (F-P) interferometer, whose resonance wavelength when interrogated by a suitable laser light source depends on strain established within the fiber. In such a system there are effectively spaced "mirrors" written into the fiber whose spacing determines the output wavelength which therefore changes with longitudinal strain within the fiber.

Alternatively, the sensing regions can be based on active or passive fiber Bragg gratings (FBG's) written into the optical fiber core. These gratings are made by producing periodic variations in the refractive index along a short section or sections of the core, and methods for fabricating such gratings are generally known in the art.

PRIOR ART

Passive FBG devices, and interrogating systems therefor, are known, for example, from U.S. Pat. Nos. 5,828,059 and 6,097,487.

As described in U.S. Pat. No. 5,828,059, for example, standard FBG devices, each operating with a different nominal operating frequency, may be advantageously written into a birefringent optical fiber, such as a side-hole fiber, which provides spectral peaks in its optical response which are spaced apart in mutually orthogonal polarisation axes of the fiber. Strain established in the fiber, which may be temperature dependent, changes the birefringence, and causes a measurable change in the wavelength spacing between the spectral peaks of the reflected light in mutually orthogonal polarisation planes.

An interrogating system suitable for measuring the positions of spectral peaks or notches derived from FBG sensors having different operating wavelengths relative to a reference wavelength is described in U.S. Pat. No. 6,097,487. In this system, part of the interrogating broad band light source is transmitted through or reflected from a Fabry-Perot interferometer configured to create a comb spectrum. Such a comb spectrum can provide an accurate frequency or wavelength scale for comparison with the respective spectral peaks or notches from sensors operating at different wavelengths, such that the through the use of suitable signal processing means accurate and repeatable wavelength measurements can be obtained. In U.S. Pat. No. 6,097,487 the reference grating and the sensor gratings are not provided in birefringent fibers, and are configured to operate at different nominal wavelengths.

An alternative configuration of sensor involves the use of active fiber lasers, particularly active FBG lasers. Such devices, and interrogating systems therefor, are described in, for example, U.S. Pat. Nos. 5,844,927 and 5,564,832. In each of these systems, an end-pumped fiber laser with distributed feedback (DFB) oscillates on two orthogonally polarised wavelengths. The distance between these wavelengths is dependent upon birefringence of a fiber, and is therefore responsive to mechanical strain within the fiber. Such strain can be temperature or pressure dependent, or can be responsive to a variety of different measurands through the use of reactive coatings or claddings on the fiber, for example.

U.S. Pat. Nos. 5,564,832 and 5,844,927 each describe interrogation systems in which the measurement of birefringence in a fiber laser sensor involves the measurement of electrical beat frequencies established between the different optical frequencies in the mutually orthogonal polarisation planes. As is well known, by superposing two slightly different frequencies together, a lower beat frequency is generated dependent upon the difference between the first two frequencies. The lower frequency regime of the beat frequency enables more convenient measurement of an electrical signal by known processing means.

In U.S. Pat. No. 5,844,927, one or more sensor FBG's are written into birefringent fibers, such that a beat frequency indicative of the wavelength spacing in different polarisation planes for each FBG may be derived. These may be compared with the output signal from a reference FBG laser, which is not written into a birefringent fiber.

The use of a suitably calibrated reference FBG laser is intended to enable accurate measurement of variations in the output from the sensor FBG's, which may be subjected to changes in pressure or temperature, for example.

In U.S. Pat. No. 5,564,832, there are a plurality of birefringent FBG devices spaced along the length of a single optical fiber, which are configured to operate at different nominal wavelengths such that the outputs are multiplexed along a single fiber. The output from these lasers is optically demultiplexed using a diffraction grating device, such that optical signals of differing wavelengths from the respective lasers are separated before they are measured. In relation to each of the separated signals, beat frequencies are then generated which are dependent upon the wavelength spacing between the spectral peaks in different polarisation planes in relation to each sensor.

SUMMARY OF THE INVENTION

It is an object of the present invention to provide an improved fiber optic sensing system, which enables higher resolution and more accurate measurements of optical frequencies, and hence of selected measurands, compared with prior art devices.

Viewed from a first aspect the Invention provides a fiber optic sensor system, comprising at least one measuring sensor providing an optical output dependent upon one or more parameters to be measured, and at least one reference sensor providing a reference output for comparison with the measuring sensor output, wherein the reference sensor is provided in a birefringent fiber, and the system includes a detecting means whereby a reference beat signal is derived by measuring the optical frequency splitting between frequency components in different polarisation planes of the reference sensor output, a further beat signal being generated between the reference measuring and reference sensor outputs, such beat signals being used to derive a measurement of one or more parameters.

A further aspect of the invention provides a fiber optic sensor system including measuring and reference sensors written into respective optical fibers, in which at least the reference sensor is written into a birefringent fiber, and the system further includes a detecting means which operates by generating a beat frequency derived from the output of the reference sensor.

A still further aspect of the invention provides a method of sensing using fiber optic sensors, in which the output from a reference sensor provided in a birefringent fiber is used to derive a beat signal for comparison with the output from a measuring sensor provided in a second fiber.

A preferred mode of operation of such a system and method is that a beat frequency derived from the reference sensor output and a beat frequency derived from a comparison between the measuring sensor output and the reference sensor output are used to derive an indication of at least one parameter of interest without the need directly to measure the absolute frequency of either sensor by optical means.

The beat frequency in a birefringent fiber is proportional to the absolute frequency, and the system can be suitably calibrated such that the beat frequency derived from the reference sensor output provides an output indicative of reference sensor temperature, for example.

The beat frequency derived from the comparison between the reference and measuring sensors may then be added to or otherwise compared with this output to derive a further output which is indicative of measuring sensor temperature.

In other words, in such a system, there may be two unknown parameters, for example the measuring and reference sensor temperatures, and two beat signals, namely the reference sensor beat and the beat between the sensor outputs, which can be used to derive a measurement of each unknown parameter without the need directly to measure the absolute frequency of either output by optical means.

In a preferred embodiment, the measuring sensor is also provided in a birefringent fiber such that the beat derived from this sensor can be used to measure a different parameter, such as pressure. Hence, in this embodiment, there would be three unknown variables, for example measuring sensor pressure and temperature and reference sensor temperature, and three beat frequencies from which measurements of each of these may be derived, again without the need directly to measure the absolute frequency of each sensor output by optical means.

Such systems can enable high resolution and accurate measurement of a frequency component of the measuring sensor output relative to the reference sensor output which is based on the frequency splitting between mutually orthogonal polarisation planes of a birefringent reference sensor fiber. This splitting will only depend on temperature provided that the reference fiber sensor is kept free from mechanical strain, and since there is one-to-one correspondence between absolute resonance frequency and the frequency splitting with varying temperature, the measured splitting is effectively a measure of the absolute reference frequency. The correspondence between splitting and absolute frequency, which is approximately linear, can be calibrated without difficulty.

The use of a birefringent reference sensor in this way can provide a more convenient and accurate reference measurement than is obtained, for example, in U.S. Pat. Nos. 5,844,927 and in 6,097,487, in which reference sensors are not written in birefringent fibers, and the reference signal provides only a single spectral peak or notch whose frequency must be measured for comparison with the measuring sensor spectra.

Moreover, the system of these aspects of the present invention differ from those described in U.S. Pat. Nos. 5,828,059 and 5,564,832, in that the system includes at least one associated pair of measuring and reference sensors provided in different fibers and, in some embodiments, having substantially the same or similar nominal operating wavelengths so that a beat signal is generated between the reference and measuring sensor outputs. The systems may include a number of measuring sensors at different nominal wavelengths and multiplexed along a common respective fiber with a single reference sensor provided in a different fiber or with multiple reference sensors.

As discussed, in one aspect of the invention, the measuring and reference sensors of each pair have the same nominal operating wavelength. This can provide the more accurate and convenient comparison between the reference and measuring spectra. Further, there is no need for optical demultiplexing of the signals from each pair of associated reference and measuring sensors, and demultiplexing can instead be achieved in the electrical domain by processing electronics. This has practical advantages.

The birefringent fiber in which the reference sensor is provided may, for example, be a side-hole fiber, a D-fiber, a Bow-Tie fiber, a Panda fiber, or another fiber with special geometry which establishes a detectable change in birefringence in response to strain and temperature.

The reference scheme of the invention has a number of different applications. It can be used to provide accurate single parameter measurements in relation to pressure, temperature or chemical or biochemical measurands, depending on the configuration of the fiber optic sensor. In this case, the reference sensor can be used for temperature compensation, for example. The frequency splitting in relation to the optical output from the birefringent reference sensor can be accurately measured to provide an indication of temperature of the reference sensor. This output can be compared with a frequency component of the measuring sensor, such comparison being particularly facilitated if the reference sensor has the same nominal operating wavelength as the measuring sensor. Based on this comparison the system can either derive a measurement of temperature at the measuring sensor, or can use the temperature measurement derived from the reference sensor to correct the output of the measuring sensor for variations in temperature, such that some other parameter can be derived from the measuring sensor, such as pressure.

The reference sensor should be kept free from strain and avoid large and fast temperature fluctuations.

The reference sensor may be located in an oven whose temperature is controlled in such a way that the reference sensor has the same nominal operating wavelength as the measuring sensor.

In an alternative arrangement, the reference sensor can be placed close to the measuring sensor. In this case, the reference sensor will naturally be at the same temperature as the measuring sensor, and the output therefrom can be used to correct the output of the measuring sensor for changes in temperature.

As is described in the prior art references discussed above, the measuring sensor can be configured in a known manner to be responsive to a variety of different measurands, in such a way that the measurands establish strain within the optical fiber in the region of the sensor in order to vary the optical response.

The or each measuring sensor may also be provided in a birefringent fiber. If the measuring sensor is not provided in a birefringent fiber, then, as discussed above, the detecting system will generally analyse only a single frequency component, i.e. a spectral peak or notch, derived from the or each measuring sensor, and compare this with a signal based on the birefringent output of the reference sensor e.g. to generate a beat signal between the measuring and reference sensor outputs in the manner described above. Two independent single frequency sensors may be used, with the system analysing the difference in wavelength between the sensors.

In the presently preferred embodiments, the or each measuring sensor is also provided in a birefringent fiber, and provides a birefringent response in relation to which measurement can be based on the absolute frequency of the response, and/or on the spacing of spectral peaks or notches in mutually orthogonal polarisation planes. This spacing can be compared with the birefringent wavelength spacing derived from the reference sensor, such that the reference sensor can be used to calibrate or correct the output from the measuring sensor. Additionally or alternatively, the absolute frequency of the measuring sensor output can be used for measurements. This enables highly accurate dual parameter measurements to be made, where two parameters, such as pressure, temperature, or biochemical parameters, can be determined by measuring the absolute frequency of the measuring sensor, the absolute frequency of the reference sensor, together with the birefringent frequency splitting of each of these sensors. As discussed above, the absolute frequency of the measuring sensor may itself be derived from beats generated between the measuring and reference sensor outputs.

In one set of embodiments the reference and measuring sensors are in the form of active fiber lasers, preferably fiber DFB lasers. At least the reference laser, and preferably also the measuring laser, is/are written into a birefringent fiber, such that the outputs each consist of spaced spectral peaks in different polarisation planes.

As discussed above, the system preferably includes detecting means which operates by generating beat frequencies in the electrical domain, which beat frequencies are lower than the optical frequencies and more convenient to measure. This general approach is known, for example, from U.S. Pat. Nos. 5,844,927 and 5,564,832.

Since the measuring and reference sensor lasers are, in accordance with this aspect of the invention, configured to have the same nominal operating wavelength, beat frequencies can be generated between the spectral peaks in the different birefringent axes of each laser, and also can be generated between frequency components of the respective lasers. Hence, three beat frequencies may, for example, be generated, a first dependent on the birefrirgence of the reference laser, a second dependent on the birefringence of the measuring laser, and a third dependent upon the difference between the lasing frequencies of the respective lasers, which beat frequencies may be indicative of particular parameters such as pressure and/or temperature in the environment of the measuring sensor. Alternatively, the measuring sensor may not be provided in a birefringent fiber, in which case beat frequencies may be based on the birefringence of the reference laser, and on the difference between the frequency of the measuring and reference lasers, which difference is established by strain in the measuring laser responsive to a particular measurand.

In either case, the output from the reference laser may if necessary be used to calibrate or correct the output from the measuring sensor in relation to a selected parameter or parameters.

Viewed from a further aspect, the invention provides a fiber laser sensor system, comprising at least two fiber lasers written into respective optical fibers, at least one of which is a birefringent fiber, and detecting means configured to generate beat signals dependent upon the birefringence of said at least one fiber, the detecting means preferably also generating beat signals between the laser outputs, which beat frequencies are used to derive a measurement of at least one parameter.

As discussed above, in this aspect, one of the is fiber lasers may constitute a reference laser which is located in a separate environment from a measuring laser. Alternatively, pairs of lasers may be located in the same environment, in differently configured fibers.

In a different set of embodiments, the sensing system is based on a passive device, preferably a passive fiber Bragg grating, most preferably a Π-phase-shifted FBG. In this case, at least the reference sensor is provided in a birefringent fiber, and the two resonances corresponding to the birefringent axes of the fiber are measured.

This measurement may be carried out in a manner which is generally similar to that described in U.S. Pat. No. 6,097,487, in which a comb spectrum derived from part of the light from a tunable light source is generated, and this comb spectrum provides an accurate frequency/wavelength scale for measurement of the spacings between the spectral notches in the birefringent output of the fiber. Examples of suitable tunable light sources are tunable single polarisation lasers or a tunable side band of an RF modulated laser.

In a preferred such system, the comb spectrum is generated by an interferometer which receives a part of the light from the tunable source, and is also effective to reduce the effect of noise in the output of the tunable source, which can otherwise limit the resolution of spectral measurements.

Such a system provides an improved apparatus for measurement of reflection and absorbent spectra enabling particularly high resolution.

Hence, a still further aspect of the invention provides a system for spectral analysis, comprising a tunable light source, part of the light from which is passed to an optical device providing a device spectrum to be measured, and part of the light from which is passed to an interferometer which generates a comb spectrum, such comb spectrum being used to provide a linearised frequency scale for measurement of the device spectrum, whereby the effect of noise in the tunable light source is reduced, and a further part of the light from the source being passed to a birefringent reference grating which provides an absolute wavelength reference. The interferometer is preferably a Michelson interferometer which acts as a frequency discriminator as well as a comb spectrum generator The interferometer has a large path imbalance. The reference grating is preferably a Π-phase shifted FBG.

Alternatively, measurements may be carried out by locking frequencies of additional fiber laser sources to the resonance frequencies and measuring electrical beat frequencies between these laser frequencies.

A further aspect of the invention provides a fiber optic sensing system comprising at least two passive Π-phase shifted FBG sensors written into respective fibers, at least one of which is a birefringent fiber, and the detecting means including means for measuring the frequency splitting between two resonances of the birefringent fiber, such splitting being used to derive a reference signal by the detecting means. As discussed above, the system preferably also measures the frequency splitting between the reference and measuring sensor outputs.

As also discussed above, it is preferred, but not essential, that both FBG's are written into birefringent fibers, in which case the detecting means may additionally be configured to measure the frequency splitting between the resonances of each birefringent fiber.

A further aspect of the invention provides a detecting means for use with a fiber optic sensing system, the detecting means including means for receiving and analysing optical outputs from at least two fiber optic sensors, which outputs have substantially the same nominal operating wavelength, and at least one of the outputs having birefringent components, the analysing means operating by comparing said outputs from the respective sensors to derive an output signal indicative of at least one parameter sensed by at least one of the sensors in use.

A further aspect of the invention provides a method of sensing a parameter through the use of a fiber optic measuring sensor in which the optical output from the sensor is compared with the optical output from a reference sensor, the reference sensor being provided in a birefringent fiber and said sensors having substantially the same nominal operating wavelength.

A still further aspect of the invention provides a dual parameter fiber optic sensing system, comprising a pair of birefringent optical fibers each having at least one sensor configured to provide a birefringent optical output dependent upon a respective parameter, and detecting means having signal processing means adapted to provide an electrical output signal indicative of the birefringence of each of said fiber.

In this, and some other embodiments of some of the above aspects of the invention, the sensors may instead be configured to operate with substantially different operating wavelengths to avoid cross-talk in the detection means.

BRIEF DESCRIPTION OF THE DRAWINGS

Some preferred embodiments of the invention will now be described, by way of example, with reference to the accompanying drawings, in which:

FIG. 7 illustrates a spectra measured through a specific setup according to FIG. 4a.

DESCRIPTION OF THE PREFERRED EMBODIMENTS

Figure 1A:
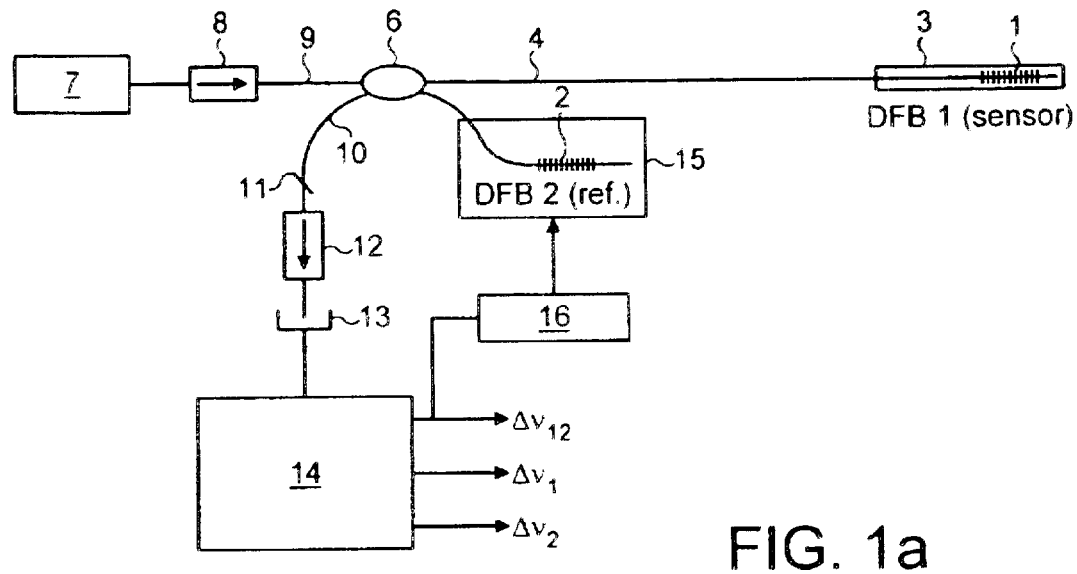
FIG. 1a shows a preferred embodiment of a two-parameter sensor system comprising two dual-polarisation fiber DFB lasers.

FIG. 1a shows a two-parameter fiber optic sensor system based on two birefringent i.e. dual-polarisation fiber DFB laser sensors, where two independent parameters are determined from the frequency splitting and the absolute optical frequency of one of the fiber DFB lasers 1, acting as the measuring sensor, using the other laser 2 as a reference sensor. Laser 1 is contained in a sensing probe house 3. The two lasers 1 and 2 are spliced to the two output ports 4 and 5 of a polarisation maintaining 2×2 coupler (PMC) 6 such that the two orthogonally polarised laser frequencies emitted from each laser are guided in each of the two orthogonal polarisation axes of the polarisation maintaining output ports 4 and 5 of the PMC. The fiber lasers, which have the same nominal operating wavelength, are pumped by a semiconductor diode 7, which can have a pump wavelength of 980 nm or 1480 nm, through an optical isolator 8 spliced to one of the input ports 9 of the PMC.

Figure 1B:
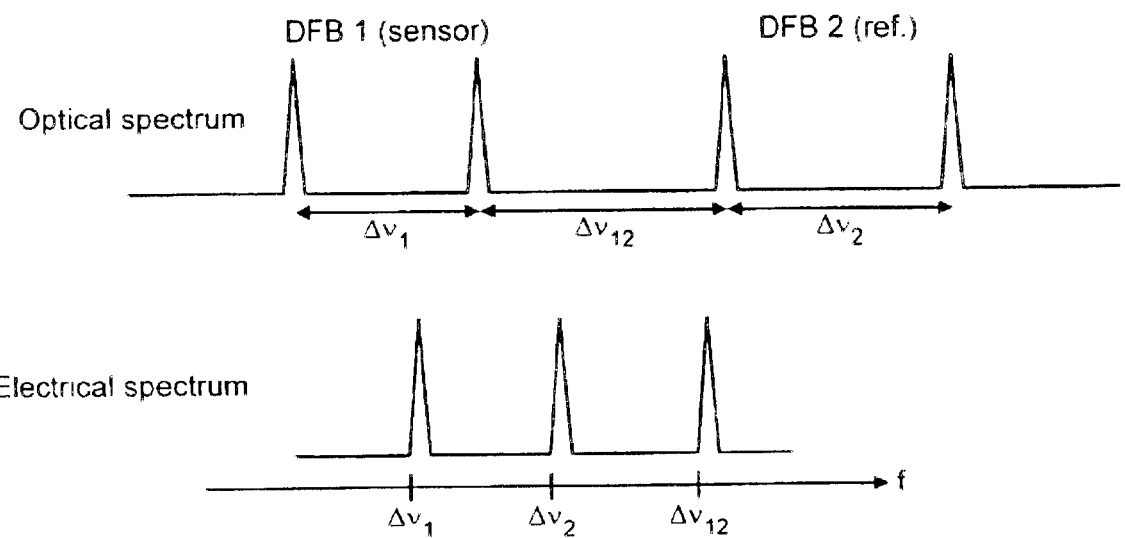
FIG. 1b shows the optical spectrum from the two dual-polarisation fiber DFB lasers and the resulting electrical beat spectrum for each of the two lasers and the beat frequency between the two lasers.

The two orthogonally polarised laser frequencies emitted from each laser, $v_1$ and $v_1+\Delta v_1$ from laser 1 and the $v_2$ and $v_2+\Delta v_2$ from laser 2 (see FIG. 1b), are guided through the PMC to the port 10, which is spliced to polarising optical isolator 12 with polarisation maintaining fiber pigtails. The splice 11 is arranged with the polarisation axes of the two fibers oriented at 45° such that orthogonally polarised laser light is mixed.

The laser light passing the isolator 12 is incident on a detector 13 followed by an electrical receiver circuit 14 with electrical receiver bandwidth BW, where the orthogonally polarised laser light is mixed to generate three electrical beat frequencies $f_1=\Delta v_1$, $f_2=\Delta v_2$ and $f_3=\Delta v_{12}$ (see FIG. 1b), where $f_1, f_2, f_3 < BW$. The beat frequency $f_3$ is a measure of the laser frequency of laser 1 relative to the laser frequency of reference laser 2. In this case $|v_2-(v_1+\Delta v_1)|$ should be <BW to ensure a beat signal between the two lasers. The electrical beat frequencies $f_1$, $f_2$, and $f_3$ provide exact information about the two parameters to be measured, and the beat frequency $f_2$ is used to determine the temperature of the reference laser and hence the exact reference frequency. Note that both lasers must be kept free from strain other than strain resulting from a parameter to be measured, since strain strongly affects the laser frequencies. The measurement of $f_3$ can be used to control the temperature of the reference laser 2 inside an oven 15 using a feedback circuit 16 such that the nominal operating wavelengths of the sensors remain the same.

The measuring sensor 1 can be configured to be responsive to a particular measurand in a known manner, such as by being provided with a reactive element or coating arranged to establish strain in the sensor and thereby change the output frequency upon exposure to a measurand.

Figure 2:
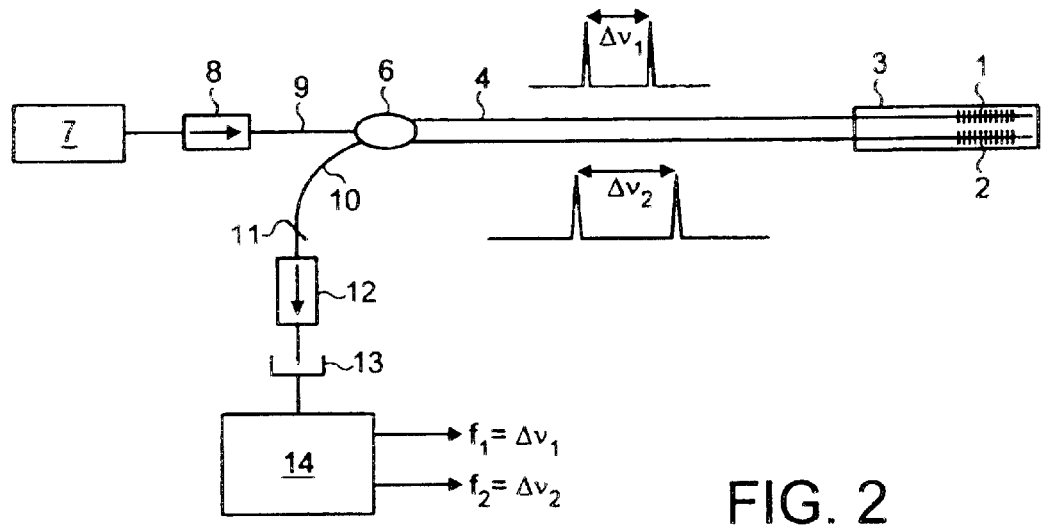
FIG. 2 shows an alternative configuration where both lasers are placed together in a sensor probe to provide dual-parameter sensing.

FIG. 2 shows sensor and reference dual-polarisation fiber DFB lasers 1 and 2, having different sensitivity to the two parameters to be measured, for example pressure and temperature, placed together in a sensing probe housing 3 to provide dual-parameter sensing. The two lasers 1 and 2 are again spliced to the two output ports 4 and 5 of a polarisation maintaining 2×2 coupler (PMC) 6 such that the two orthogonally polarised laser frequencies emitted from each laser are guided in each of the two orthogonal polarisation axes of the polarisation maintaining output ports 4 and 5 of the PMC. The fiber lasers are pumped by a semiconductor diode 7, which can have a pump wavelength of 980 nm or 148 nm, through an optical isolator 8 spliced to one of the input ports 9 of the PMC. The two orthogonally polarised laser frequencies emitted from each laser, $v_1$ and $v_1+\Delta v_1$ from laser 1 and $v_2$ and $v_2+\Delta v_2$ from laser 2 (see FIG. 1b), are guided through the PMC to the port 10, which is spliced to polarising optical isolator 12 by means of polarisation maintaining fiber pigtails. The splice 11 is carried out with the polarisation axes of the two fibers oriented at 45° such that orthogonally polarised laser light is mixed. The laser light passing the isolator 12 is incident on a detector 13 followed by an electrical receiver circuit 14 with electrical receiver bandwidth BW, where the orthogonally polarised laser light is mixed to generate two electrical beat frequencies $f_1=\Delta v_1$ and $f_2=\Delta v_2$ (see FIG. 1b), where $f_1$ and $f_2$<BW. Note that $v_2-(v_1+\Delta v_1)$ can, in this embodiment, be >BW to prevent a beat signal being generated between the two lasers. The electrical beat frequencies $f_1$ and $f_2$ provide exact information about the two parameters to be measured, provided the two lasers are under equal temperature and strain conditions.

Alternatively, a beat signal may additionally be measured between the lasers. Such a signal can be used to monitor, e.g. anomalies in the sensor probe.

Figure 3:
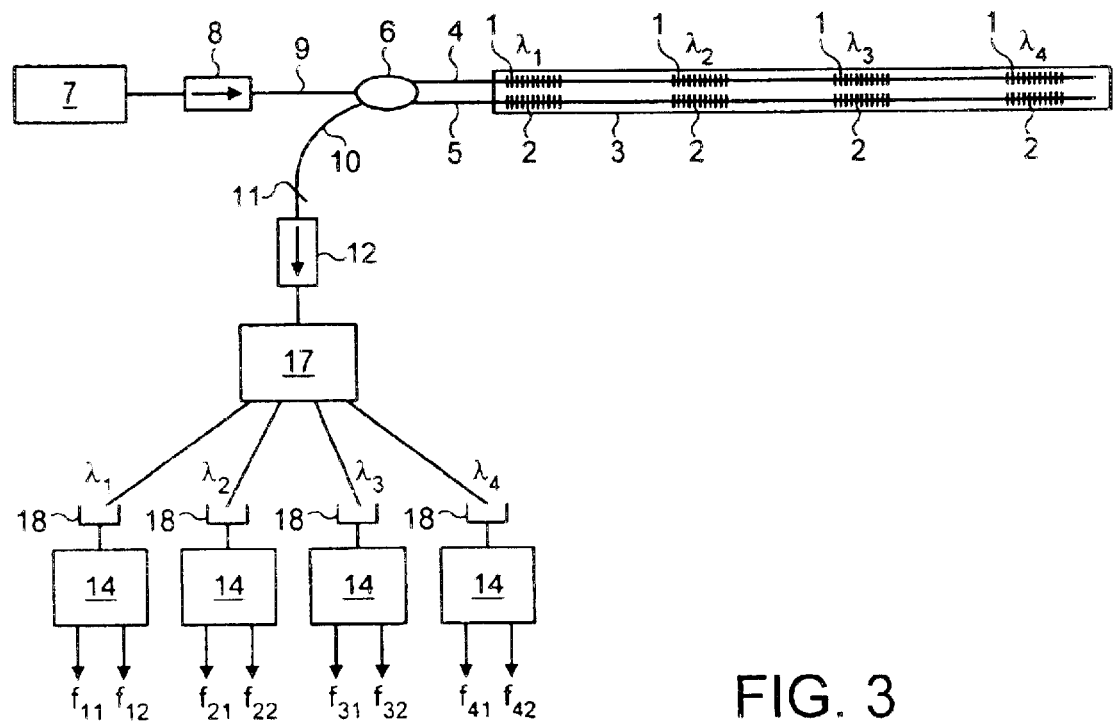
FIG. 3 shows a preferred embodiment of a distributed two-parameter sensor system which consists of linear arrays of wavelength multiplexed fiber DFB lasers with the reference DFB lasers placed side-by-side with the corresponding sensor DFB lasers.

FIG. 3 shows a distributed sensing system where a series of dual-polarisation fiber DFB lasers 1 and 2 contained in pairs in sensor probes 3 are wavelength multiplexed along two different polarisation maintaining fibers with laser wavelengths $\lambda_i$, i=1,2,3,4. The two fibers are spliced in the two output ports 4 and 5 of a polarisation maintaining 2×2 coupler (PMC) 6 such that the two orthogonally polarised laser frequencies emitted from each laser are guided in each of the two orthogonal polarisation axes of the polarisation maintaining output ports 4 and 5 of the PMC. The fiber lasers are pumped by a semiconductor diode 7, which can have a pump wavelength of 980 nm or 1480 nm, through an optical isolator 8 spliced to one of the input ports 9 of the PMC. The two orthogonally polarised laser frequencies emitted from each laser are guided through the PMC to the port 10, which is spliced to polarising optical isolator 12 with polarisation maintaining fiber pigtails, the splice 11 being achieved with the polarisation axes of the two fibers oriented at 45° such that orthogonally polarised laser light is mixed. The laser light passing the isolator 12 is passed through a wavelength demultiplexer 17 which splits the light from the different wavelength multiplexed lasers with wavelengths $\lambda_i$, i=1,2,3,4 onto separate detectors 18 followed by electrical receiver circuits 14 with electrical receiver bandwidth BW. The orthogonally polarised laser light is mixed to generate electrical beat frequencies $f_{i1}$ and $f_{i2}$, i=1,2,3,4, where $f_{i1}$ and $f_{i2}$<BW. The wavelength difference between the respective wavelength multiplexed pairs of reference and sensing lasers must be large enough to eliminate cross-talk between the different laser pairs, typically >1 nm.

Again, in an alternative embodiment, beat frequencies may additionally be measured between the lasers.

Figure 4A:
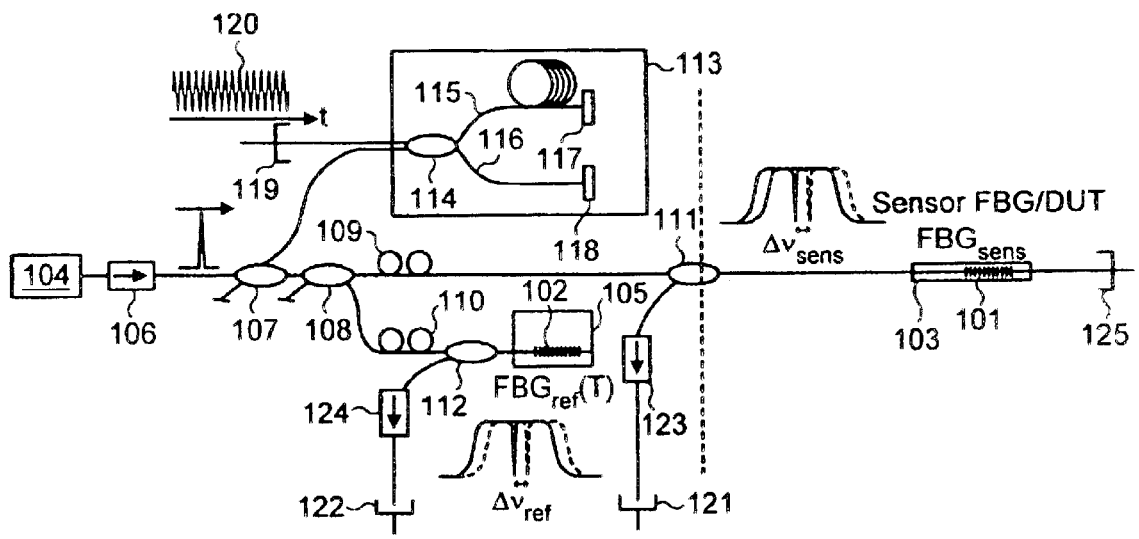
FIG. 4a shows a preferred embodiment of a two-parameter sensor system comprising passive birefringent Π-phase-shifted FBG measured with a narrow band tuneable laser polarised along each of the two polarisation axes, respectively.

FIG. 4a shows a preferred embodiment of a two-parameter sensor system based on two passive birefringent Π-phase-shifted FBGs, where two independent parameters are determined by measuring both the frequency splitting and the absolute optical frequency of one of the Π-phase-shifted FBGs 101 acting as the measuring sensor, using the other FBG 102 as a reference sensor. FBG 101 is contained in a sensing probe house 103, where the FBG should be eliminated from strain and rapid temperature variations. The two FBGs are illuminated by a frequency swept narrowband laser 104, which preferentially is a strain tuned single polarisation fiber DFB laser, which is frequency swept over a frequency range covering the orthogonally polarised resonance frequencies of both FBGs 101 and 102. The reference FBG 102 is kept free from strain and its temperature is controlled inside an oven 105 to minimise the wavelength separation between the two FBGs, and hence the required laser tuning range, and to minimise temperature variations of the reference FBG.

The laser light passes an optical isolator 106 before it is split by a direction coupler 107, where one part is again split by a 50/50 coupler 108 and directed to FBG 101 and 102 through polarisation controller (PC) 109 and 50/50 coupler 111, and PC 116 and 50/50 coupler 112, respectively. The polarisation controllers are used to align the polarisation of the laser light at 45° relative to the two orthogonal polarisation axes of each FBG. The second part of the light split by coupler 107 is passed to a reference Michelson interferometer 113, which is packaged such that rapid temperature fluctuations are minimised. The interferometer consists of a 50/50 coupler 114, two fiber arms 115 and 116, with a path imbalance ΔL, which is typically 10–100 m, with Faraday mirrors 117 and 118 at the end of each fiber arm.

Figure 4B:
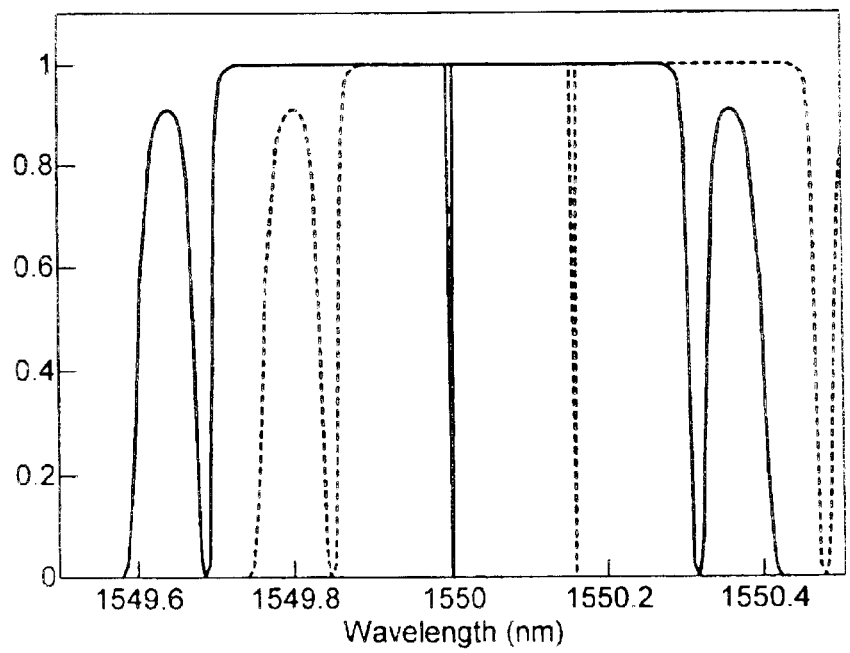
FIG. 4b shows the reflection spectrum of the two orthogonal polarisations of a birefringent Π-phase-shifted FBG measured with a narrowband tuneable laser polarised along each of the two polarisation axes.
Figure 4C:
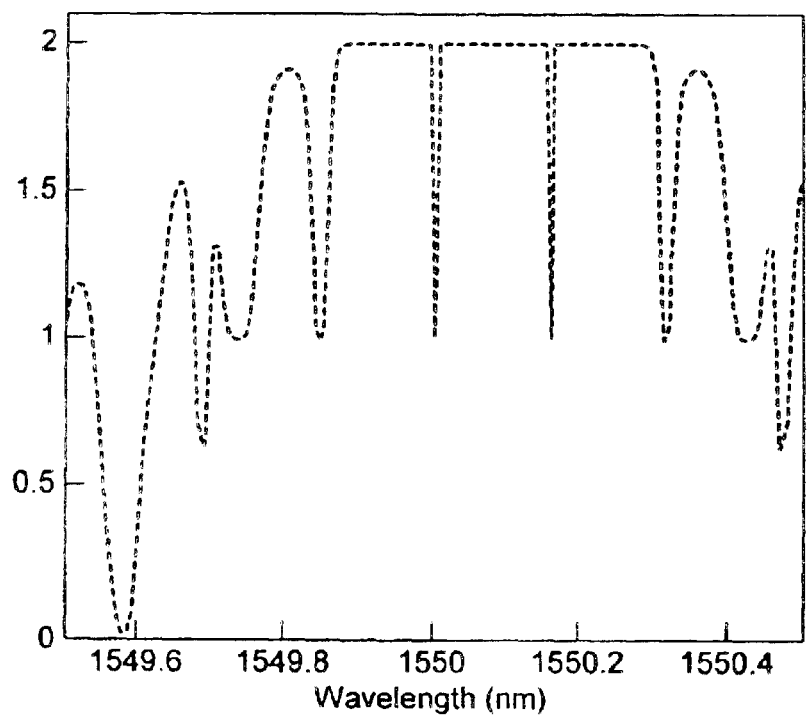
FIG. 4c shows the reflection spectrum of a birefringent Π-phase-shifted FBG measured with a narrow band tuneable laser polarised at 45° relative to the birefringent axes of the FBG.

The use of Faraday mirrors eliminates polarisation fading in the reference interferometer. The reflected light from the reference interferometer 113 is passed to a reference detector 119. The detected reference signal consists of a pulse train 120 with equidistant peaks corresponding to the free spectral range of the reference interferometer. The reflected light from the FBGs 101 and 102 are directed to detector 121 and 122 through coupler 111 and isolator 123, and coupler 112 and isolator 124, respectively. The detector signals are the result from scanning the two orthogonally polarised spectra of the high finesse Π-phase-shifted FBG, illustrated in FIG. 4b at 45°, with solid and dotted lines, respectively. The resulting spectrum is shown in FIG. 4c, clearly showing two narrowband dips in the spectrum, which separation is directly proportional to the fiber birefringence.

Figure 4D:
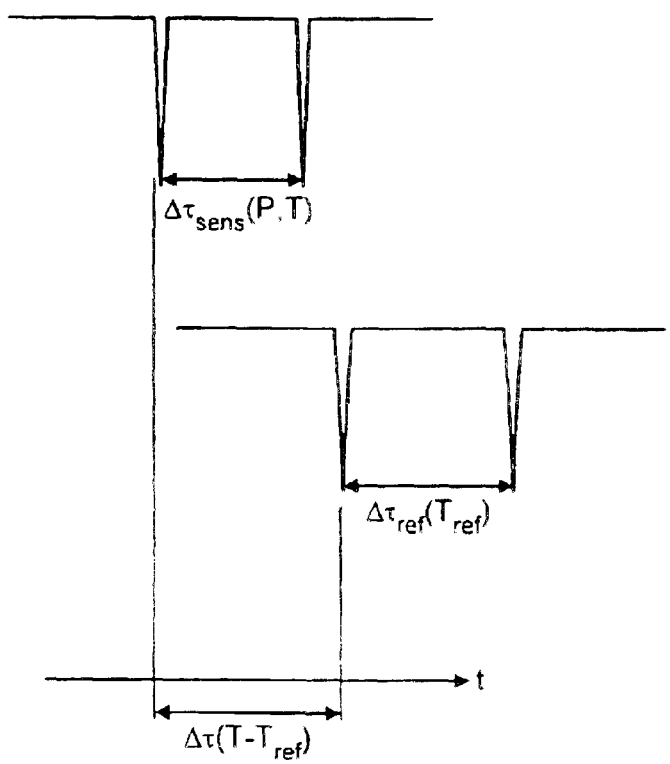
FIG. 4d shows the measured reflection spectra of the measuring and reference sensor Π-phase-shifted FBGs, and illustrates how the measured resonance frequencies can be used to measure two independent parameters such as temperature and pressure or temperature and strain.

By comparing the detector signals from detector 121 and 122, corresponding to the sensor FBG 101 and reference FBG 102, which are shown schematically in FIG. 4*d* around the narrowband dips, and using the reference signal 120 from reference detector 119 as a frequency scale to linearise the laser frequency scan, the frequency splitting of the sensor and reference FBG, corresponding to the time splitting $\Delta\tau_{sen3}$ and $\Delta\tau_{ref}$ in FIG. 4*d*, as well as the relative frequency splitting of the two spectra, corresponding to $\Delta\tau$ in FIG. 4*d*, can be determined with high accuracy. This provides an accurate dual parameter sensing scheme, where the two parameters can be pressure and temperature of the sensor FBG.

Figure 5:
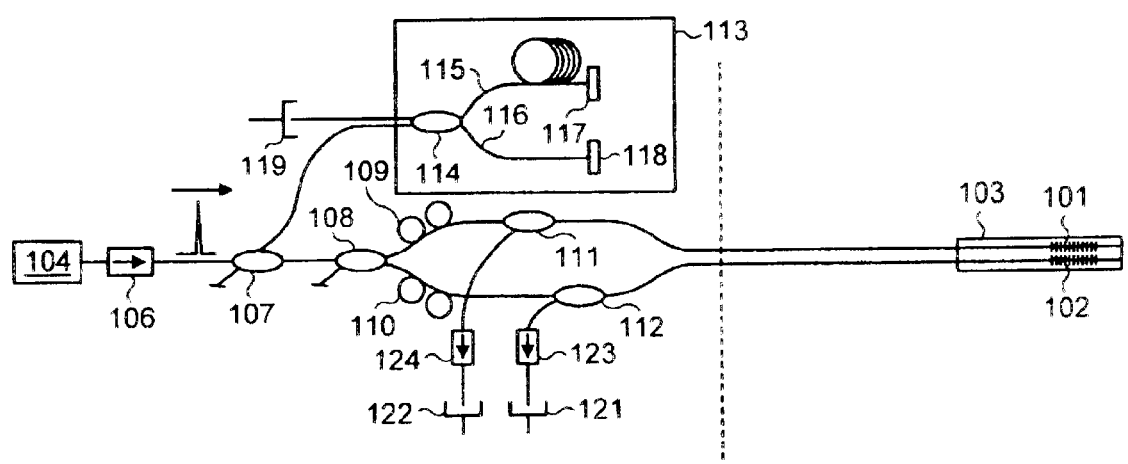
FIG. 5 shows an alternative system in which both the FBGs are placed together in a sensor probe to provide dual parameter sensing.

FIG. 5 shows a preferred embodiment of a two-parameter sensor system based on two passive birefringent Π-phase-shifted FBGs, with exactly the same configuration as in FIG. 4*a*, only with the difference that the two FBGs 101 and 102 are placed side-by-side inside the sensor housing 103, and that the two independent parameters are determined by measuring only the individual frequency splitting of each FBG, and not their relative frequency separation. This has the advantage of eliminating errors due to strain effects (in the case of pressure and temperature measurements), provided both FBGs experience the same strain.

Figure 6:
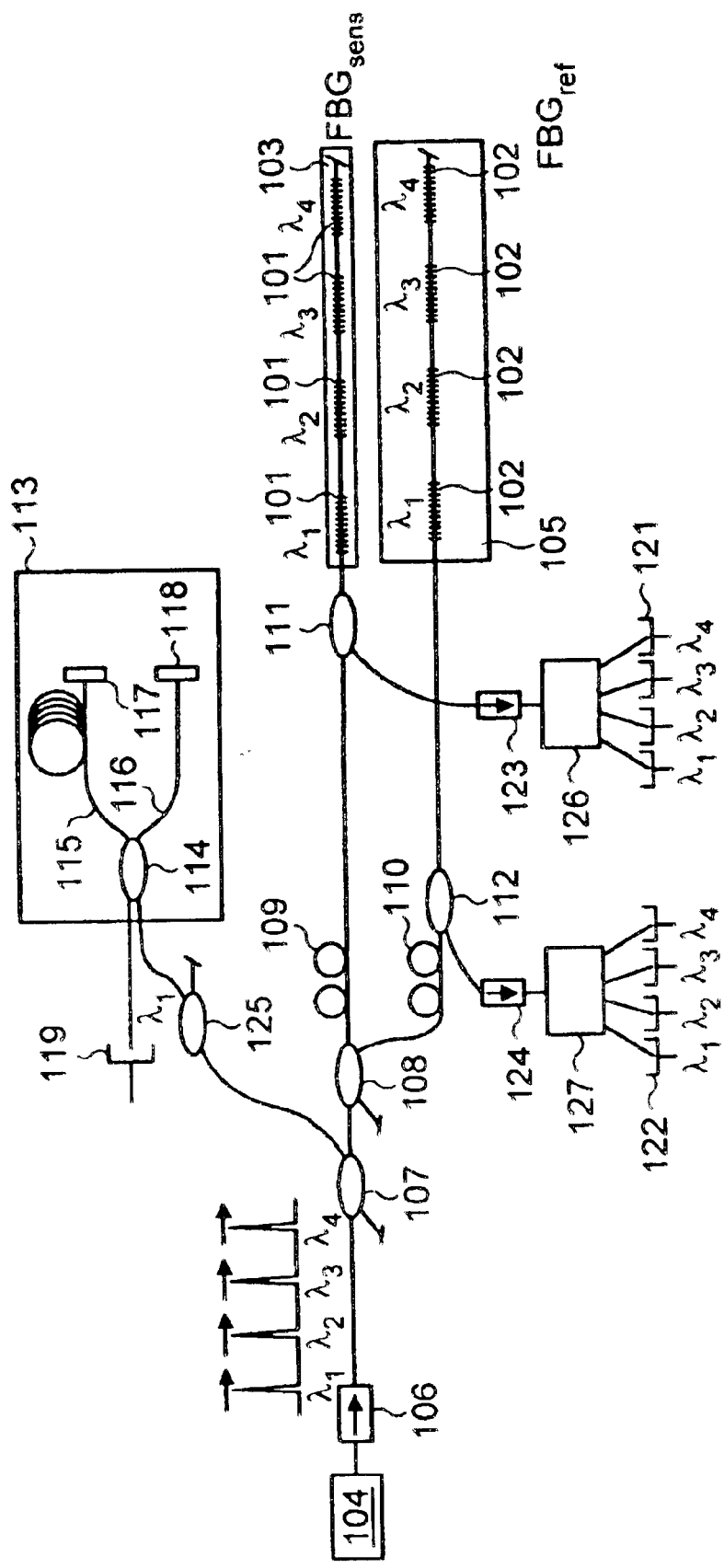
FIG. 6 shows an embodiment of distributed two-parameter sensor system based on linear arrays of wavelength multiplexed Π-phase-shifted FBGs.

FIG. 6 shows a preferred embodiment of a distributed two-parameter sensor system based on linear arrays of wavelength multiplexed Π-phase-shifted FBGs. The configuration is the same as in FIG. 4*a* and FIG. 5, only with the difference that the frequency swept laser source 4' has n output wavelengths (here n=4) with a spacing of typically >1 nm which are swept in parallel to cover both n sensor FBGs 1 and n reference FBGs 2 with different Bragg wavelengths matching the different laser wavelengths. Preferably the laser array consists of n strain tuned singled polarisation fiber DFB lasers along one fiber or in n parallel fibers pumped with one pump diode laser. The reflected light from the FBGs 101 and 102 is directed to separate detectors 121 and 122, through wavelength demultiplexers 126 and 127, for the sensor and reference wavelengths, respectively. Only one of the laser wavelengths is directed to the reference Michelson interferometer 113 by using a WDM coupler or filter 125, which is sufficient to linearise the wavelength sweep provided that all wavelengths are swept equally.

In an alternative to the embodiment shown in FIG. 6, a single tunable laser tuning all sensor wavelengths may be used. In this case only a single reference sensor may be used.

Figure 7A:
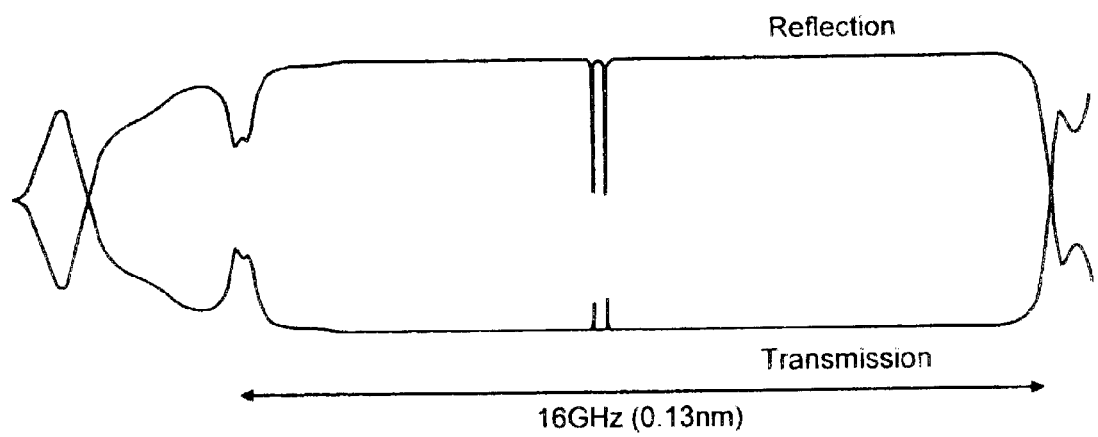

FIGS. 7*a* and *b*, show the simultaneously measured reflection and transmission spectra of a birefringent Π-phase-shifted FBG (device under test—DTU) 101 using a setup very similar to the one illustrated in FIG. 4*a*, illustrating how the setup can be used as an ultra-high-resolution optical spectrum analyser for characterisation of wavelength dependent optical components such as FBGs.

Figure 7B:
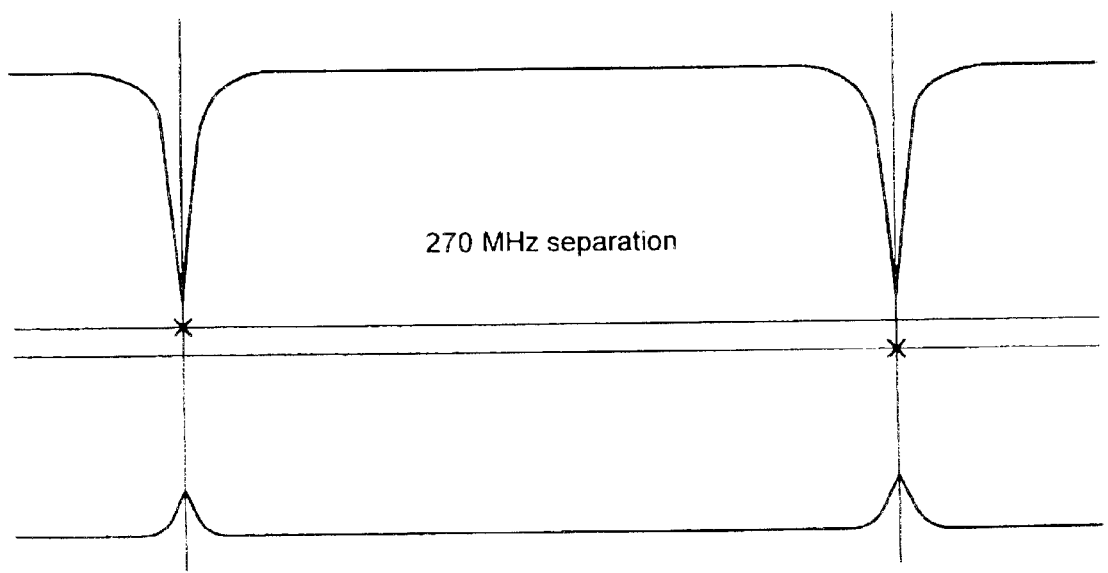

In a particular embodiment, the frequency swept narrowband laser 104 shown in FIG. 4*a* is a strained tuned single polarisation fiber DFB laser polarised at 45° relative to the polarisation eigenaxes of the FBG. The reference Michelson interferometer 113 has a path length imbalance of ca. 30 m, which gives sinusoidal fringes (comb spectrum) with a periodicity of ca. 3 MHz. The reference fringes are used to sample the laser frequency and hence linearise the frequency scale and reduce the effect of the laser frequency noise on the measured spectra. The transmission spectrum of the FBG 101 is measured with a separate optional detector 125 at the output end of the FBG. FIG. 7*a* shows the measured spectrum over the full bandwidth of the FBG (ca. 16 GHz or 0.13 nm), while FIG. 7*b* shows a close-up of the two orthogonally polarised resonances, which have splitting of 270 MHz and a bandwidths of ca. 10 MHz, which is fully resolved with the measurement setup. By use of the reference FBG the absolute wavelengths of the spectrum can be determined.

What is claimed is:

1. A fiber optic sensing system comprising at least two passive π-phase shifted FBG sensors written into respective fibers, at least one of which is a birefringent fiber, and detecting instrumentation including instrumentation for measuring the frequency splitting between two resonances of the birefringent fiber, the detecting instrumentation being arranged to derive a reference signal using said frequency splitting.

2. A system as claimed in claim 1 comprising instrumentation for measuring a frequency splitting between the reference and measuring sensor outputs.

3. A system as claimed in claim 1 wherein both of said FBG's are written into birefringent fibers.

4. A system as claimed in claim 3 wherein said detecting instrumentation is additionally configured to measure a frequency splitting between resonances of each birefringent fiber.

5. Detecting instrumentation for use with a fiber optic sensing system, the detecting instrumentation including analysis instrumentation for receiving and analysing optical outputs from at least two fiber optic sensors, wherein said optical outputs have substantially the same nominal operating wavelength, and at least one of the outputs having birefringent components, the analysis instrumentation being arranged to operate by comparing said optical outputs from said at least two fiber optic sensors to derive an output signal indicative of at least one parameter sensed by at least one of the sensors in use.

6. A dual parameter fiber optic sensing system, comprising a pair of birefringent optical fibers each having at least one passive π-phase shifted FBG sensor configured to provide a birefringent optical output dependent upon a respective parameter, and detecting instrumentation having signal processing instrumentation adapted to provide an electrical output signal indicative of the birefringence of each of said fiber.

7. A system as claimed in claim 6 wherein said sensors are configured to operate with substantially different operating wavelengths.

8. A method of sensing a parameter comprising:
providing a fiber optic measuring sensor having measuring optical output;
providing a birefringent fiber optic reference sensor having a reference optical output; and
comparing said measuring optical output with said reference optical output, wherein said measuring and reference sensors have substantially the same nominal operating wavelength.

9. A method of sensing using:
at least two passive π-phase shifted FBG sensors written into respective fibers, at least one of which is a birefringent fiber; and
detecting instrumentation;
the method comprising:
measuring a frequency splitting between said two resonances of the birefringent fiber; and
said detecting instrumentation using said splitting to derive a reference signal.

10. A method as claimed in claim 9 comprising measuring a frequency splitting between the outputs of said two passive π-phase shifted FBG sensors.

11. A method as claimed in claim 9 wherein both of said passive π-phase shifted FBG sensors are written into birefringent fibers, each having two resonances, said method further comprising measuring the frequency splitting between the resonances of each birefringent fiber.

12. A method of deriving an output signal indicative of at least one parameter comprising:

providing at least two fiber optic sensors providing optical outputs with substantially the same nominal operating wavelength, at least one of said outputs having birefringent components;

receiving and analysing said optical outputs; and comparing said optical outputs to derive said output signal indicative of the at least one parameter.

* * * * *